R. E. MARTIN.
SAW BLADE.
APPLICATION FILED APR. 13, 1909.

942,920.

Patented Dec. 14, 1909.

WITNESSES:
E. A. Pell
M. A. Johnson

INVENTOR
Robert E. Martin,
BY
Wm. H. Canfield
ATTORNEY

UNITED STATES PATENT OFFICE.

ROBERT E. MARTIN, OF NEWARK, NEW JERSEY.

SAW-BLADE.

942,920.

Specification of Letters Patent. Patented Dec. 14, 1909.

Application filed April 13, 1909. Serial No. 469,689.

*To all whom it may concern:*

Be it known that I, ROBERT E. MARTIN, a citizen of the United States, residing at Newark, in the county of Essex and State of New Jersey, have invented certain new and useful Improvements in Saw-Blades; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a saw, and is designed to provide a tool for carpenters that will facilitate the sawing of timber whether along the grain or cross-cut, and is designed to combine a cross-cut saw and a rip saw on the blade.

The invention is further designed to provide a blade having an inclined or curved set of teeth on the outer edge of the back so that the device can be used to start a cut on a wooden surface without starting in from the edge, and also without necessitating the drilling of holes or the chiseling away a part of the surface to allow the introduction of the blade. This is particularly desirable in cases where it is necessary to cut away the flooring of a room, or any board partition, when it is desired to replace the boards.

The teeth on the inclined or curved edge of the back permit the starting of the cut by means of the saw by giving the teeth the usual sawing action, this being easy, since the curvature or the angle of the teeth on the back raises the handle a considerable distance from the floor.

The invention is illustrated in the accompanying drawing, in which—

Figure 1:
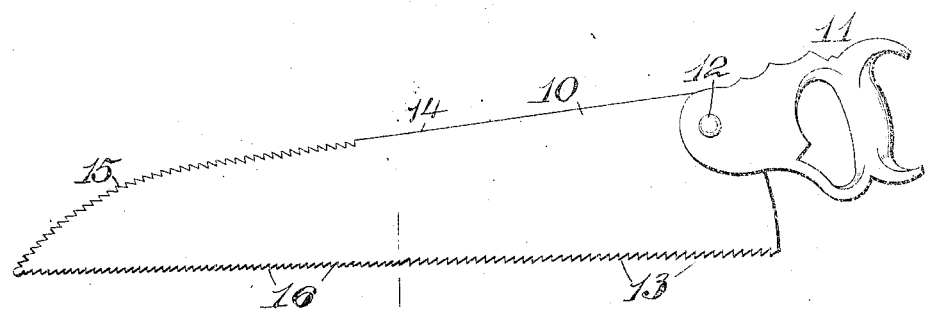
Figure 2:
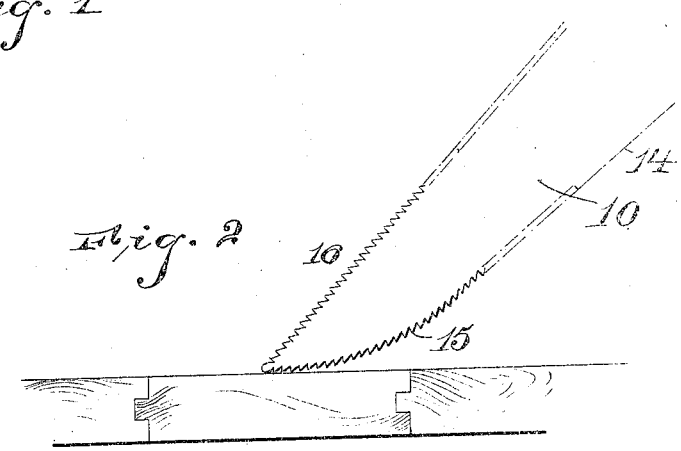
Figure 3:
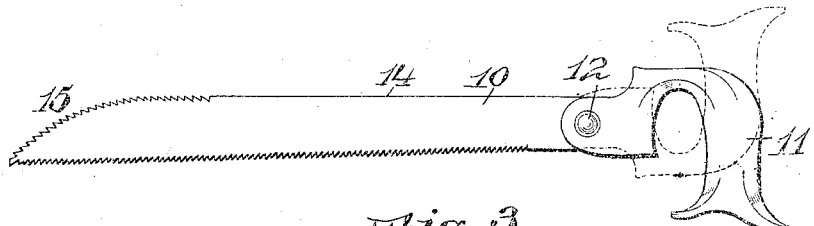

Figure 1 is a side view of a saw of my improved construction, and Fig. 2 is a detail showing the manner of using the blade when the back of the blade is to be used for starting a cut in a plane surface. Fig. 3 is a side view of a modified form of saw showing the adaptation of the reversible handle to the blade.

The blade 10 is provided with any usual handle 11 which is preferably held by a bolt 12 which passes through the handle and through the blade, the handle being split to receive the blade, as is common in the manufacture of saws. The handle is made so that it can be removed and replaced in a reversed position, as will be seen from Fig. 3, this reversible feature not necessarily being confined to the form of handle shown in Fig. 3, but the handle shown in Fig. 1 can be made reversible, and the reversible handle is the preferred one. The lower edge of the blade is preferably straight and is provided with teeth, the teeth for a portion of the distance, as at 16, being cross-cut, being teeth known as cross-cut teeth or the teeth that are used on a cross-cut saw, and the teeth 13 are those of a rip saw, that is, the saw that is used along the grain. It has been demonstrated by test that a saw combining these two sets of teeth when operated the full length, either ripping or cutting across the grain, will work faster than a saw having teeth of the one kind along its cutting edge. It will also be observed that the start of the cut is easier, on different kinds of wood and different cuts in relation to the grain, with one kind of tooth, and in other cases with another kind of tooth, and in this tool the kind of tooth best adapted for the work in hand can be used for starting the cut without mutilating the edge of the wood unnecessarily in getting the cut well started.

The back edge 14 of the blade is inclined or curved on its outer edge so that it meets the front edge, and is provided with teeth 15 which can be either rip-teeth or cross-cut teeth, but are preferably cross-cut. This inclined or curved outer end of the back edge forms a means, not present in hand-saws as at present constructed, for cutting into a plane wooden surface without the necessity of boring holes to give a chance to insert the saw-blade, or without chiseling an opening to permit the insertion of the blade of the saw. This is shown in Fig. 2, and in a case where a floor is to be cut away, the teeth 15, with their curved shape, form a ready means for rocking the blade and at the same time giving it a reciprocating motion so that it soon cuts through the floor, and after this penetration is accomplished the saw can be reversed, inserted in the cut, and the cut then proceeded with as with an ordinary handsaw. No previous construction of handsaws has permitted this use of being operated on a plane surface and penetrating through a small portion thereof to permit the insertion of the blade so that the straight edge of the saw can be used.

Having thus described my invention, what I claim is:—

1. A saw comprising a blade having a main cutting edge straight for its entire length and provided with teeth, the back of the blade being devoid of teeth for a major portion of its length, and being curved and provided with teeth on its outer end whereby a curved sawing surface is provided on the outer edge of the back.

2. A blade for saws having a main cutting edge straight for its entire length and provided with teeth, the back edge of the blade being straight and devoid of teeth for a major portion of its length and slightly tapered or inclined toward the front edge, the back edge at its end being curved to meet at a point with the main cutting edge whereby a rounded sawing surface is provided on the outer end of the back.

In testimony, that I claim the foregoing, I have hereunto set my hand this 12th day of April, 1909.

ROBERT E. MARTIN.

Witnesses:
 WM. H. CAMFIELD,
 E. A. PELL.